US012568307B2

(12) United States Patent
Che et al.

(10) Patent No.: US 12,568,307 B2
(45) Date of Patent: Mar. 3, 2026

(54) BIO-IMAGING DEVICES AND METHODS OF USING SAME

(71) Applicant: Azure Biosystems Inc., Dublin, CA (US)

(72) Inventors: Diping Che, San Ramon, CA (US); Lipo Xu, Beijing (CN); Sanmen Liu, Beijing (CN); Yanzhou Kang, Beijing (CN); Zhefu Zhang, Beijing (CN)

(73) Assignee: Azure Biosystems Inc., Dublin, CA (US)

( * ) Notice: Subject to any disclaimer, the term of this patent is extended or adjusted under 35 U.S.C. 154(b) by 236 days.

(21) Appl. No.: 18/360,806

(22) Filed: Jul. 28, 2023

(65) Prior Publication Data

US 2024/0040242 A1     Feb. 1, 2024

Related U.S. Application Data

(60) Provisional application No. 63/393,017, filed on Jul. 28, 2022.

(51) Int. Cl.
| | |
|---|---|
| *H04N 23/661* | (2023.01) |
| *G01N 21/01* | (2006.01) |
| *G01N 21/17* | (2006.01) |
| *G01N 21/76* | (2006.01) |
| *G02B 21/08* | (2006.01) |
(Continued)

(52) U.S. Cl.
CPC ........... *H04N 23/661* (2023.01); *G01N 21/01* (2013.01); *G02B 21/088* (2013.01); *G02B 21/361* (2013.01); *H04N 23/50* (2023.01); *G01N 2021/1765* (2013.01); *G01N 21/76* (2013.01); *G01N 2223/40* (2013.01); *H04N 23/62* (2023.01)

(58) Field of Classification Search
CPC ...... H04N 23/661; H04N 23/50; H04N 23/62; H04N 23/56; G01N 21/01; G01N 21/76; G01N 2021/1765; G01N 2223/40; G02B 21/088; G02B 21/361
USPC ......................................................... 356/244
See application file for complete search history.

(56) References Cited

U.S. PATENT DOCUMENTS

| | | | |
|---|---|---|---|
| 9,322,767 B2 * | 4/2016 | Ehrenkranz ........ | G01N 15/1484 |
| 10,520,437 B1 * | 12/2019 | Stebbins ................ | G02B 21/16 |
(Continued)

FOREIGN PATENT DOCUMENTS

KR          101926059 B1 * 12/2018    ............... G02B 7/02

OTHER PUBLICATIONS

Zhu, Wenbin, et al. "Smartphone epifluorescence microscopy for cellular imaging of fresh tissue in low-resource settings." Biomedical optics express 11.1 (2019): 89-98. (Year: 2019).*
(Continued)

*Primary Examiner* — Michelle M Iacoletti
*Assistant Examiner* — Noah J. Haney
(74) *Attorney, Agent, or Firm* — INCUBATE IP; Randy R. Micheletti

(57) ABSTRACT

Biological systems and methods of using same are disclosed. The systems comprise a biological imaging device and a mobile computing device in communication therewith. The biological imaging device includes a single-board computer embedded with control software, enabling remote operation and image acquisition from the mobile computing device without installing the control software thereon, thereby enhancing operational efficiency and user convenience.

12 Claims, 7 Drawing Sheets

(51) Int. Cl.

| | | |
|---|---|---|
| *G02B 21/36* | (2006.01) | |
| *H04N 23/50* | (2023.01) | |
| *H04N 23/62* | (2023.01) | |

(56) References Cited

U.S. PATENT DOCUMENTS

| | | | | |
|---|---|---|---|---|
| 2005/0051723 A1* | 3/2005 | Neagle | .................. | C12M 41/14 |
| | | | | 250/306 |
| 2013/0163002 A1* | 6/2013 | Kim | .................... | G03H 1/0443 |
| | | | | 356/450 |
| 2014/0152793 A1* | 6/2014 | Staker | ..................... | H04N 7/18 |
| | | | | 348/79 |
| 2015/0035966 A1* | 2/2015 | Salsman | ............ | G02B 21/0008 |
| | | | | 348/80 |
| 2015/0185456 A1* | 7/2015 | Kishima | ............. | G02B 21/008 |
| | | | | 348/80 |

| | | | | |
|---|---|---|---|---|
| 2016/0277663 A1* | 9/2016 | Lee | ...................... | G02B 21/244 |
| 2017/0241912 A1* | 8/2017 | Wietzorrek | ........ | G01N 21/6456 |
| 2018/0275388 A1* | 9/2018 | Zou | ........................ | G02B 21/26 |
| 2019/0021602 A1* | 1/2019 | Hurley | .............. | G01N 21/6456 |
| 2021/0090238 A1* | 3/2021 | Gallagher-Gruber | ...................... | |
| | | | | G01N 15/1433 |
| 2021/0208064 A1* | 7/2021 | Bhargava | ................. | G01J 3/02 |
| 2022/0078332 A1* | 3/2022 | Hirai | ..................... | H04N 7/181 |
| 2023/0314787 A1* | 10/2023 | Fiolka | ................. | G02B 21/364 |
| | | | | 348/79 |

OTHER PUBLICATIONS

Göröcs, Zoltán, and Aydogan Ozcan. "Biomedical imaging and sensing using flatbed scanners." Lab on a Chip 14.17 (2014): 3248-3257. (Year: 2014).*

* cited by examiner

10

300

LAN

Imaging Device                    Mobile Device 100                    200

40

410 → Start

412 → Imaging parameters setting up

414 → Initial image acquisition

416 → Post image processing

418 → Final image storage

420 → Image analysis

422 → Analysis storage

424 → Final image & analysis displaying

50

510 → Start

512 → Channel imaging parameters setting up

514 → Initial channel image acquisition

516 → Post channel image processing

518 → Channel image analysis

520 → Image analysis storage

R/G/B channel

522 → RGB composite image creating

524 → RGB composite image storage

526 → RGB composite image & analysis displaying

BIO-IMAGING DEVICES AND METHODS OF USING SAME

PRIORITY CLAIM

This application claims priority to U.S. Provisional Patent Application Ser. No. 63/393,017, filed on Jul. 28, 2022, the entire contents of which are incorporated herein and relied upon.

FIELD

The present disclosure provides devices for imaging biological substrates and methods of using same to obtain images of biological substrates.

BACKGROUND

Chemiluminescence, fluorescence and bioluminescence imaging technology have become powerful tools in life science with the development of advanced imaging equipment. Because of its high level of sensitivity and efficiency, luminescent imagers are widely used in detection of various analytics.

Typically, bio-imaging devices include a screen on the device's surface. Users must use the screen to control all the luminescent detection process. Other bio-imaging devices are hardwire connected to a dedicated computer that includes a monitor to enable users to manipulate all of the control and display procedures. After images are shown on the imaging device or the dedicated computer, users are only then allowed to transfer the images to their personal computers for local storage and image analysis. The images acquired are not directly displayed on users' computer- which is not convenient for users who prefer to use their own laptop or desktop and requires additional expenditure on dedicated computing hardware and extra steps to obtain a bio-image.

Smartphones, tablet computers, and personal computers have become ubiquitous since the genesis of bio-imaging devices. Yet the inventors are not aware of any robust scientific bio-imaging devices or systems that leverage the impressive computing power of smartphone, tablet computers, or personal computers to conveniently obtain, process, or analyze bio-images.

To the contrary, bio-imaging devices generally require proprietary software programs to be installed on the computing devices to enable users to control the imaging device. But software installation takes time, occupies large amounts of memory, and requires a computer with a high level of CPU. In large organizations and startup labs, purchasing seat licenses for each researcher to place bio-imager software on their personal computing devices would be cost-prohibitive, and users would be required to update software versions frequently to realize any convenience. Thus, bio-imaging systems that require installed software has not been realistic for users who want to control the imaging device through their smartphone or tablet.

Furthermore, blot image analysis is cumbersome and complicated, and typically requires detailed training before user can realize the full power of image analysis software.

A need therefore continues to exist for improved bio-image devices, systems, and methods of analyzing biological substrates. Devices and systems consistent with the present disclosure meet this need.

SUMMARY

The present disclosure provides devices for imaging biological substrates and methods of using same to obtain images of biological substrates. In general, the devices disclosed herein enable convenient and efficient scanning and imaging of a biological substrate and transmission of the image(s) to a networked computing device.

According to the present disclosure, a small-size, screen-free bio-imaging device useful for image acquisition, image processing and image analysis is provided. The bio-imaging device includes an imaging subsystem and a control subsystem. The imaging subsystem comprises one or more mirrors to reflect light from the specimen to a lens unit and a camera unit. The angles of the mirrors are precisely set. The angle of at least one of the mirrors can be adjusted.

Bio-imaging devices consistent with the present disclosure can comprise a trans-illuminator or/and an epi-illuminator in the imaging subsystem. The trans-illuminator, which is used for visible imaging, can be a LED, or lamp, or laser. The epi-illuminator, which is used for visible color imaging or for fluorescent imaging, can be a LED, or lamp, or laser. A filter ahead of the epi-illuminator and the lens unit is selected according to the light channel. The control subsystem includes a single board computer and a main control board. The single board computer is physically connected with the main control board and the camera unit. It sends signal to the camera unit and receives signal from the camera unit directly. The main control board obtains signals from the single board computer and sends signals to electric components in the imaging subsystem. Software for image acquisition, image processing and image analysis may be installed in the single board computer in advance.

It is one object of the present disclosure to provide methods for connecting mobile device to the bio-imaging device. The bio-imaging device can connect to local area network via cable or WiFi adaptor. Any mobile device, including computer, smartphone, tablet, can connect to the bio-imaging device directly through cable or WiFi hotspot generated by the control subsystem. Alternatively, mobile devices can connect to the bio-imaging device through a local area network. The user interface may be a web-based application, such as a browser. Software installation (e.g., specific to the bio-imaging device) on user's computer, smartphone, or tablet is not needed. The user can open the user interface by entering a specific IP address in the browser on their mobile device, or by scanning a specific code on the bio-imaging device with their mobile device. Users can easily interact with the software embedded in the control subsystem.

It is another object of the present disclosure to provide an easy method for chemiluminescent imaging and analysis. The method includes clicking on start on any browser by user, the bio-imaging device automatically acquiring image, processing image, and analyzing image, the final processed image and the analysis results being displayed on user's browser directly.

It is another object of the present disclosure to provide a simple method for visible color or fluorescent imaging and analysis. The method includes clicking on start on any browser by user, the bio-imaging device automatically acquiring channel image, processing channel image, and analyzing channel image, software in the bio-imaging device automatically compositing all channel images, final composited image and the analysis data being displayed on user's browser.

All of the methods for imaging and analysis are easy and simple. Users can directly obtain a final bio-image and its related analysis results just by clicking on one button of the mobile device.

Other features and advantages of the present invention will be apparent from the following descriptions taken in conjunction with the accompanying drawings.

In some embodiments, the present disclosure provides a bio-imaging device comprising: an imaging subsystem including: a substrate holder configured to support a substrate to be imaged, at least one illumination source configured to contact the substrate with light radiation, a first mirror configured to reflect light emitted or transmitted by the substrate through the substrate holder, a second mirror configured to reflect light reflected by the first mirror, a lens configured to focus light reflected by the second mirror, and a camera configured to capture light focused by the lens; and a control subsystem including: a main control board configured to control operation of the imaging subsystem, and a single board computer configured to communicate with the main control board and communicate with a mobile computing device.

In other embodiments, the present disclosure provides a bio-imaging system comprising: a bio-imaging device as disclosed herein; a data network in operable communication with the bio-imaging device; and a mobile computing device in operable communication with the bio-imaging device.

In still other embodiments, the present disclosure provides a method of obtaining a bio-image of a substrate, the method comprising: placing a substrate on the substrate holder of the bio-imaging device of the bio-imaging system as disclosed herein; optionally illuminating the substrate with the at least one illumination source; capturing, via the camera, light emanating from or transmitted by the substrate; and transmitting, via the control subsystem, data associated with the captured light to the mobile computing device.

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

Referring generally to FIGS. 1-5, the present disclosure provides bio-imaging devices, bio-imaging systems including at least one bio-imaging device, and methods of obtaining a bio-image of a substrate using a bio-imaging system as disclosed herein.

Bio-Imaging Devices

Figure 1:
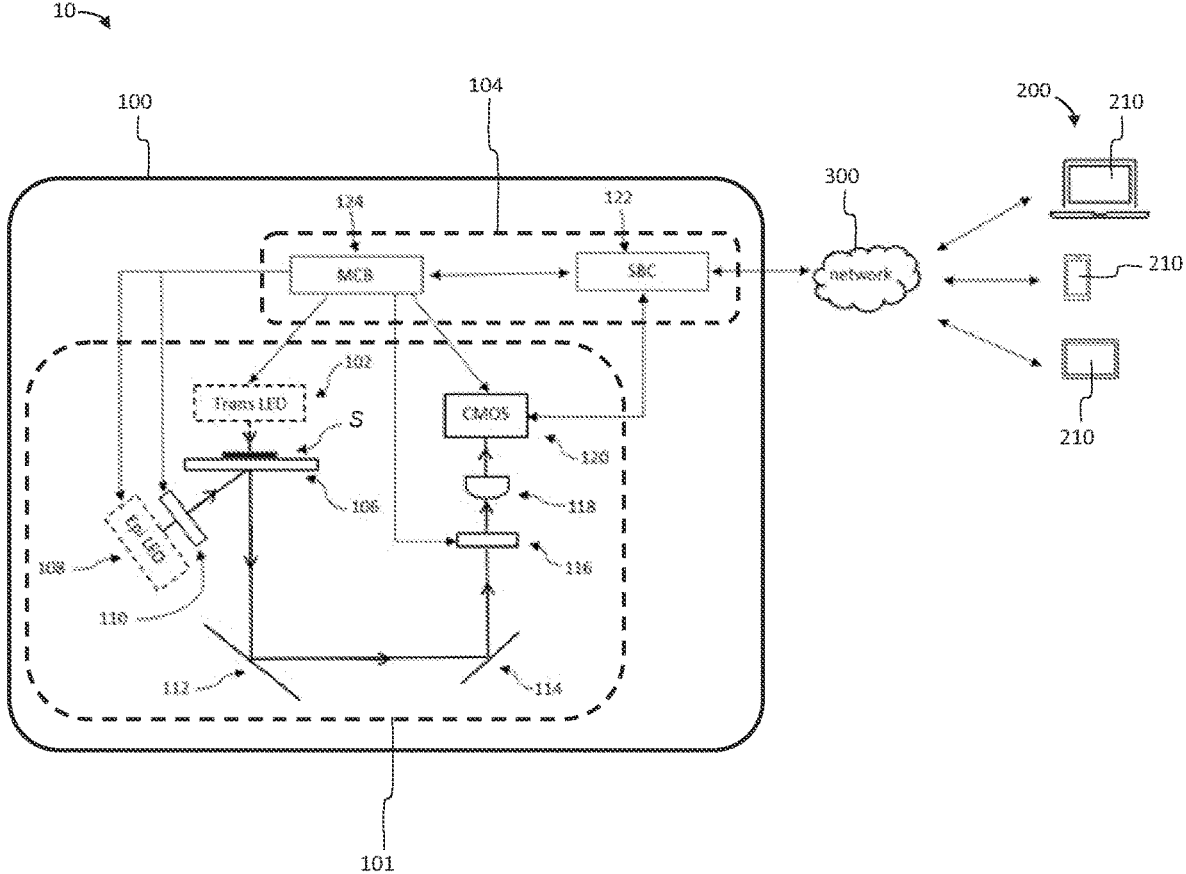
FIG. 1 shows a schematic representation of a bio-imaging system comprising a bio-imaging device, a network, and at least one mobile computing device consistent with one embodiment of the present disclosure.
Figure 2A:
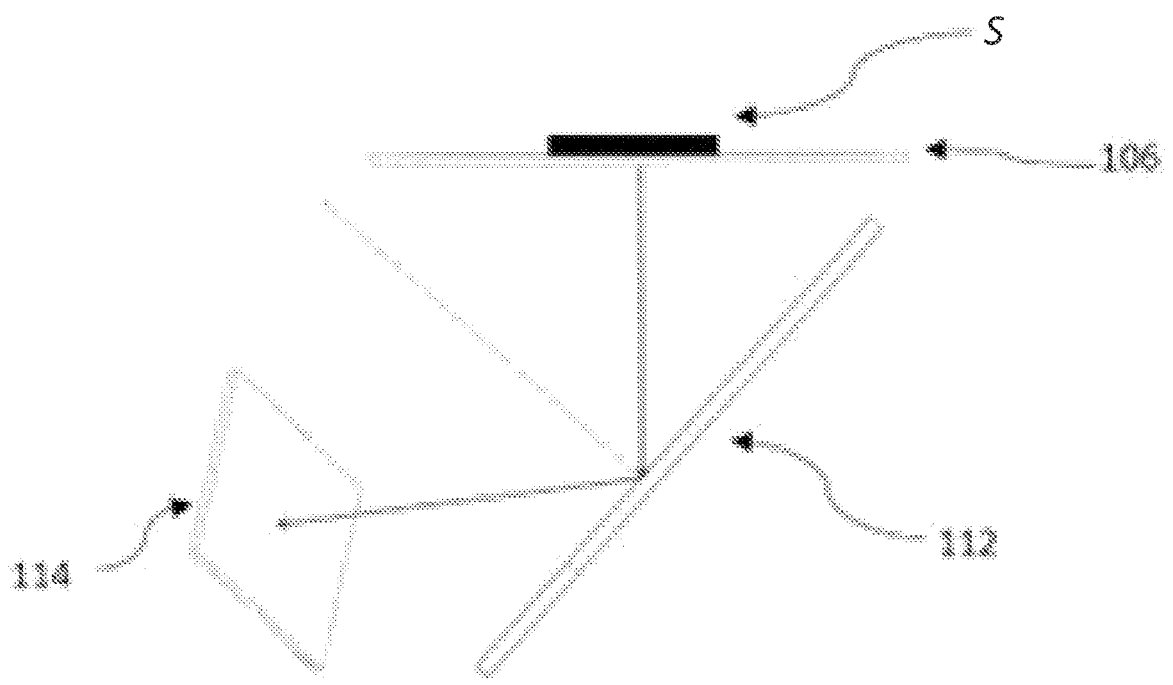
FIG. 2A shows a schematic representation of a portion of a bio-imaging device consistent with one embodiment of the present disclosure.
Figure 2B:
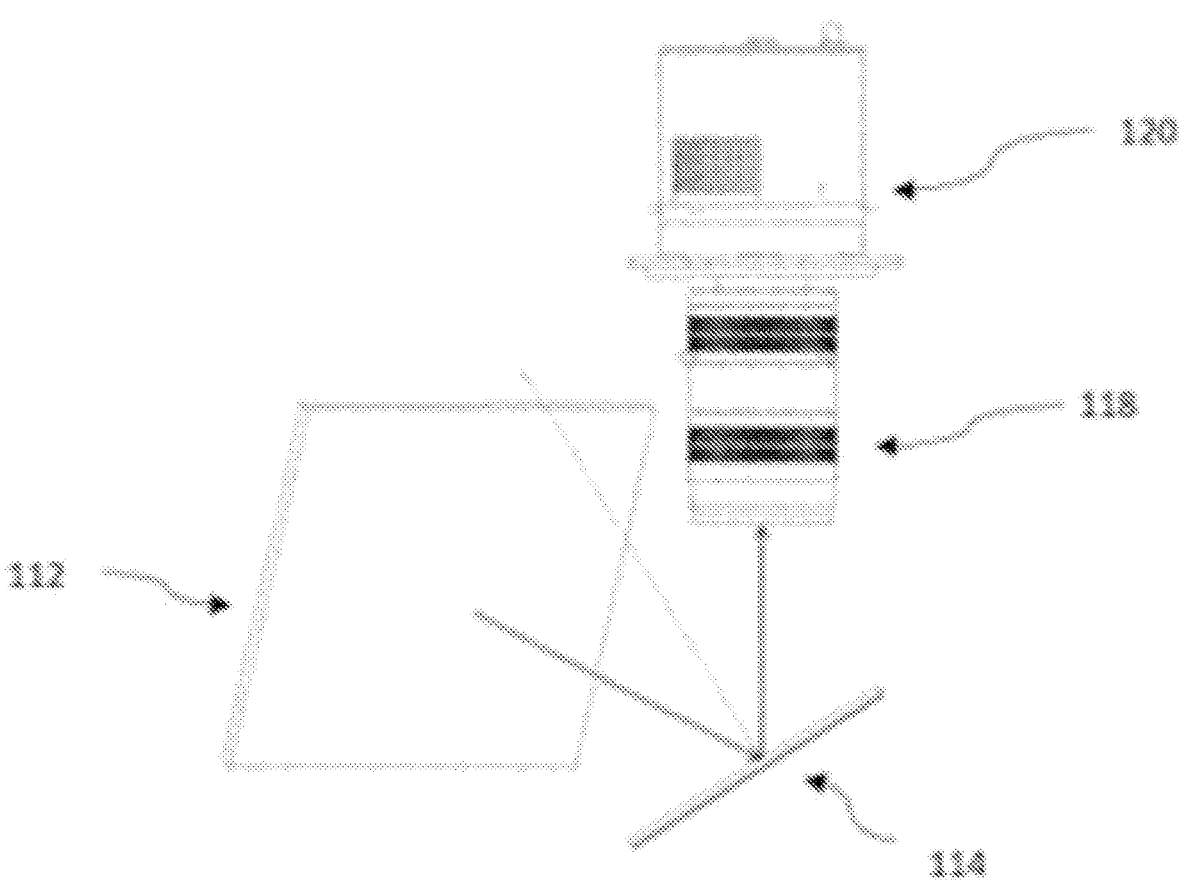
FIG. 2B shows a schematic representation of another portion of a bio-imaging device consistent with one embodiment of the present disclosure.

Referring now to FIGS. 1-2B, bio-imaging devices 100 consistent with the present disclosure do not include a display screen (e.g., for viewing setup parameters, acquired data, and/or acquired bio-images). In some embodiments, the bio-imaging device 100 comprises an imaging subsystem 101 and a control subsystem 104, optionally housed in a shell (not shown).

The imaging subsystem 101 includes a metal casing (not shown) disposed in the shell. A plate glass 106 used as a specimen holder is set on top of the metal casing. In some embodiments, the inner side of the plate glass 106 includes an antireflective coating to eliminate ghosts from the glass reflection. The imaging subsystem 101 also includes a lens 118 and a camera 120. The lens 118 may in some embodiments be supported by a holder (not shown) in the metal casing and mounted to the camera 120.

In some embodiments, the camera 120 is a complementary metal-oxide semiconductor (CMOS). In other embodiments, the camera 120 can be any other appropriate solid-state imaging device, such as a charge-coupled device (CCD).

In some embodiments, the imaging subsystem 101 also includes a main mirror 112 and an adjustable mirror 114 in the metal casing, as shown in FIG. 1. The main mirror 112 is disposed at an angle relative to the plate glass 106 to reflect light emitted by or transmitted from the specimen S. In some embodiments, the angle between the incidence light and the reflection light of the main mirror 112 is about 90° to about 100°, for example about 90°, about 91°, about 92°, about 93°, about 94°, about 95°, about 96°, about 97°, about 98°, about 99°, or about 100°. In some embodiments, the angle between the incidence light and the reflection light of the main mirror 112 is 96.7°.

The adjustable mirror 114 is disposed to reflect light from the main mirror 112 to the lens 118. The adjustable mirror 114 is configured such that its angle relative to the main mirror 112 can be adjusted, for example in a range of ±2°. In some embodiments, the angle between the incidence light and the reflection light on the adjustable mirror 114 is about 55° to about 70°, for example about 55°, about 56°, about 57°, about 58°, about 59°, about 60°, about 61°, about 62°, about 63°, about 64°, about 65°, about 66°, about 67°, about 68°, about 69°, or about 70°. In some embodiments, the angle between the incidence light and the reflection light on the adjustable mirror 114 is 63.17°.

The light emitted by or reflected from the specimen S passes through the plate glass 106 to the main mirror 112, and is then reflected by the main mirror 112 to the adjustable mirror 114. The light reflected by the adjustable mirror 114 is transmitted to the lens 118 and the camera 120. To maximize capture of the light emitted by the specimen S, the length and width of the main mirror 112 may be approximately 165 cm×145 cm, and the length and width of the adjustable mirror 114 may be approximately 86 cm×70 cm.

In other embodiments, the imaging subsystem 101 includes only one mirror 114. In such embodiments, the angle of the mirror 114 relative to the plate glass 106 is adjustable. Light emitted by or reflected from the specimen S passes through the plate glass 106 and is directly reflected by the adjustable mirror 114 to the lens 118 and then to the camera 120.

The imaging subsystem 101 in some embodiments optionally includes a trans-illuminator 102 and/or an epi-illuminator 108 if the specimen S needs a light source. In some embodiments, the trans-illuminator 102 includes one or more LED lamps disposed relative to the specimen S opposite the plate glass 106, such as installed in the lid of the shell. Trans-illuminator 102 may be particularly useful for visible color imaging. In some embodiments, the trans-illuminator 102 includes a laser emitter.

The epi-illuminator 108, when present, may in some embodiments include one or more LED lamps disposed such that the plate glass 106 is between the epi-illuminator 108 and the specimen S, for example in the metal casing. The epi-illuminator 108, when present, may be particularly useful for capturing bio-images of a substrate S as visible color images or fluorescent images. In some embodiments, the epi-illuminator 108 includes a laser emitter.

A filter wheel 110 may be disposed between the epi-illuminator 108 and the plate glass 106. A filter wheel 116 may be disposed between the adjustable mirror 114 and the lens 118. Clear and fluorescent filters in the filter wheels 110, 116 can be selected by the user and/or by the control subsystem 104 to correspond to the light source produced by the epi-illuminator 108 or the fluorescence emitted by the specimen S.

When the bio-imaging device 100 is used for detecting chemiluminescence, no light source is required from an epi-illuminator 108 or a trans-illuminator 102; in such operating modes the filters in the filter wheel(s) 110, 116 will be chosen to be clear. The luminescence emitted by the specimen S will pass through the plate glass 106, reflected by the main mirror 112 and the adjustable mirror 114, then focused by the lens 118 to the camera 120.

When the bio-imaging device 100 is used for visible color imaging of a substrate S, either trans-illuminator 102 or epi-illuminator 108 can be chosen to emit white/red/green/blue light, and the filter(s) will be chosen to be clear. Light emitted by the trans-illuminator 102 or the epi-illuminator 108 will partially pass through or be reflected by the specimen S, then be reflected by the main mirror 112 and the adjustable mirror 114 to the lens 118 and the camera 120.

When the bio-imaging device 100 is used for fluorescent detection, epi-illuminator 108 is selected to generate excitation light and the excitation filter 110 will be chosen according to the excitation light consistent with standard methods known to those of skill in the art. The excitation light passes through the excitation filter 110 and the plate glass 106 to the specimen S. The fluorescence emitted by the specimen S will pass through the plate glass 106, be reflected by the main mirror 112 and the adjustable mirror 114, pass through the emission filter 116, be focused by the lens 118 to the camera 120.

The control subsystem 104 is configured to communicate with the network 300 and/or directly with the mobile computing device 200, and with the imaging subsystem 101. In some embodiments, the control subsystem 104 includes a single board computer (SBC) 122 and a main control board (MCB) 124. In some embodiments, the single board computer 122 is a Raspberry Pi. The SBC 122 generally includes a microprocessor, a network interface and a memory component (e.g., RAM). In some embodiments, the SBC 122 includes an external data storage device, such as a Secure Digital (SD) card, to enable additional software and data storage. The network interface is generally an Ethernet, although other data input/output connectors may be used instead. In some embodiments, the SBC 122 is capable of configuring its own WiFi hotspot, such as a Raspberry Pi 3 or a Raspberry Pi 4 SBC.

In some embodiments, the SBC 122 is configured to send data to and receive data from the camera 120 directly. In other embodiments, the SBC 122 is configured to send data to and receive data from the camera 120 via the main control board 124.

The main control board 124 is configured to receive signals from the SBC 122, to send signals to the SBC 122, and to operate various components of the image subsystem 101, such as the epi-illuminator 108, the trans-illuminator 102, the excitation filter 110, the emission filter 116, and the camera 120. In some embodiments, the main control board 124 includes SBC interface circuitry for interfacing and powering the SBC 122. The SBC interface circuitry provides power to the SBC 122 and enables the main control board 124 to send data to and receive data from the SBC 122. The main control board 124 in some embodiments physically connects with the camera 120, the trans-illuminator 102, the epi-illuminator 108 and the filter wheels 110, 116, if present. The main control board 124 can provide power to the camera 120, the trans-illuminator 102, the epi-illuminator 108, and the filter wheels 110, 116, if present. In some embodiments, the main control board 124 is configured to send control signals to and receive signals from the trans-illuminator 102, the epi-illuminator 108, and the filter wheels 110, 116, if present. The main control board 124 uses an external power supply, such as from an AC/DC converter or a DC battery source (not shown).

In some embodiments, software for controlling the bio-imaging device 100, including processes of image acquisition, image processing, and/or image analysis, is embedded in the SBC 122. In other embodiments, software for controlling the bio-imaging device 100, including processes of image acquisition, image processing, and/or image analysis is obtained by the main control board 124 and/or by the SBC 122 via the network 300.

In some embodiments, a bio-imaging device consistent with the present disclosure comprises: an imaging subsystem including: a substrate holder configured to support a substrate to be imaged, at least one illumination source configured to contact the substrate with light radiation, a first mirror configured to reflect light emitted or transmitted by the substrate through the substrate holder, a second mirror configured to reflect light reflected by the first mirror, a lens configured to focus light reflected by the second mirror, and a camera configured to capture light focused by the lens; and a control subsystem including: a main control board configured to control operation of the imaging subsystem, and a single board computer configured to communicate with the main control board and communicate with a mobile computing device. In some embodiments, the bio-imaging device does not include a display screen. In some embodiments, the first mirror is disposed at a fixed angle relative to a plane defined by a surface of the substrate holder. In some embodiments, the second mirror is disposed at an adjustable angle relative to the first mirror. In some embodiments, the bio-imaging device further comprises a first filter disposed between the second mirror and the lens. In some embodiments, the at least one illumination source comprises a trans-illuminator disposed to emit light through the specimen toward the substrate holder and the first mirror (e.g., the trans-illuminator may be disposed opposite the substrate holder relative to the substrate). In some embodiments, the at least one illumination source comprises an epi-illuminator disposed to reflect light off the specimen toward the first mirror (e.g., the substrate holder may be disposed between the epi-illuminator and the substrate). In some embodiments, the bio-imaging device further comprises a second filter disposed between the epi-illuminator and the substrate holder. In some embodiments, the at least one illumination source, the first mirror, the second mirror, the lens, and the camera define an optical path.

Bio-Imaging Systems

Bio-imaging systems 10 disclosed herein offer convenient imaging of biological substrates heretofore not possible using conventional technologies. As shown representatively in FIGS. 1 and 3A-3B, bio-imaging systems 10 consistent with the present disclosure generally comprise a bio-imaging device 100 in operable communication with a mobile computing device 200 (e.g., smartphone, tablet computer, laptop computer, etc.) optionally via a data network 300.

FIG. 1 illustrates a simplified block diagram of a bio-imaging system 10 consistent with one embodiment of the present disclosure. Broadly, a bio-imaging system 10 consistent with the present disclosure comprises a bio-imaging device 100 and a mobile computing device 200. For example and without limitation, the mobile computing device 200 can be a personal computer (e.g., a laptop or desktop computer), a smartphone, or a tablet computing device.

Generally, the bio-imaging system 10 is configured to enable a user to control operation of the bio-imaging device 100 entirely or substantially entirely using the mobile computing device 200. For example and without limitation, bio-imaging systems 10 consistent with the present disclosure are configured to receive user inputs via the mobile computing device 200, rather than via the bio-imaging device 100. The user inputs may be associated with setup of the bio-imaging device 100, operation of the bio-imaging device 100 (e.g., to capture a bio-image of a substrate S), etc.

Figure 3A:
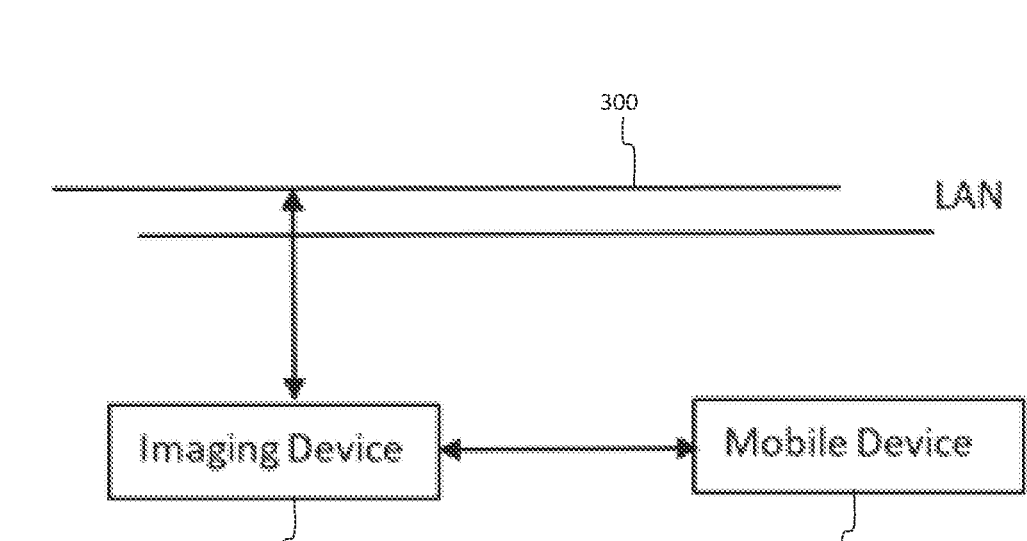
FIG. 3A shows a schematic representation of a bio-imaging system consistent with one embodiment of the present disclosure.

Referring now to FIG. 3A, in some embodiments the mobile computing device 200 may communicate directly with the bio-imaging device 100, rather than through the network 300. In such embodiments, the mobile computing device 200 may communicate with the bio-imaging device 100 via a wired or wireless protocol. For example and without limitation, the wired protocol may be accomplished via a USB connection, an Ethernet connection, etc. The wireless protocol may be accomplished via a near-field communication (NFC) protocol, a Bluetooth protocol, etc.

Figure 3B:
FIG. 3B shows a schematic representation of a bio-imaging system consistent with another embodiment of the present disclosure.
Figure 3B:
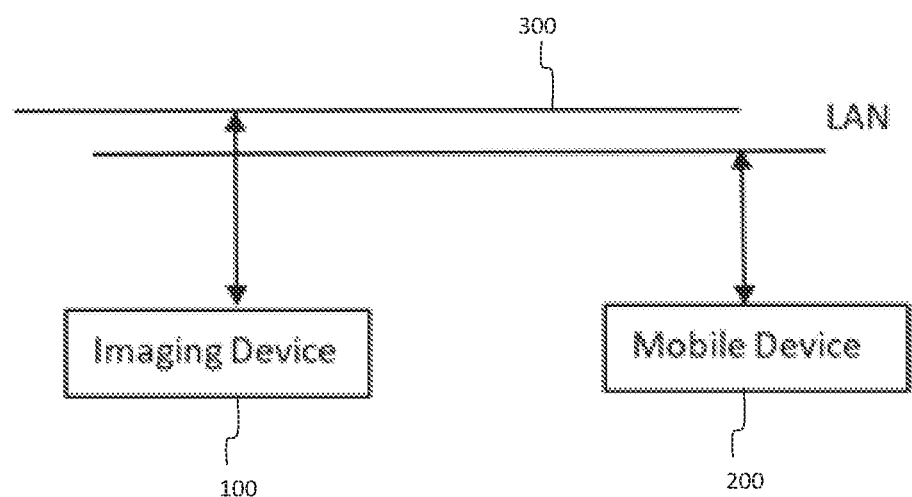

Referring to FIG. 3B, in some embodiments the mobile computing device 200 communicates with the bio-imaging device 100 via a network 300. In such embodiments, the mobile computing device 200 may communicate with the bio-imaging device 100 via a wired or wireless protocol. For example and without limitation, the wired protocol may be accomplished via a USB connection, an Ethernet connection, etc. The wireless protocol may be accomplished via a WiFi connection, for example with a personal area network (PAN), a near-me area network, a local area network (LAN), a campus area network (CAN), a cloud-based network, an Internet network, or an intranet network.

In some embodiments, an SBC of the bio-imaging device 100 may be configured to control, including image acquisition, processing and analysis, the bio-imaging device 100. The bio-imaging system may be configured to enable a user to utilize a specific IP address on any web browser or to scan a specific code (e.g., a scannable code such as a bar code or QR code) on the bio-imaging device 100 to access software for controlling the bio-imaging device 100 (including capture of a bio-image of a substrate S) from the user's mobile computing device 200 (e.g., computer, smartphone, or tablet). In some embodiments, the user is not required to download software specific to the bio-imaging device 100 or the bio-imaging system 10 to the mobile computing device 200 to enable control of the bio-imaging device 100. For example, in some embodiments a user controls the bio-imaging device 100 via an Internet browser user interface on the mobile computing device 200.

In some embodiments, a bio-imaging system consistent with the present disclosure comprises: a bio-imaging device as disclosed herein; a data network in operable communication with the bio-imaging device; and a mobile computing device in operable communication with the bio-imaging device. In some embodiments, the mobile computing device is in operable communication with the bio-imaging device via the data network. In some embodiments, the mobile computing device is directly in operable communication with bio-imaging device not via the data network. In some embodiments, the data network employs a near-field communications (NFC) protocol. In some embodiments, the data network is a WiFi network, a local area network, an ethernet network, a cellular network, an Internet network, or an intranet network. In some embodiments, the mobile computing device comprises a mobile phone (e.g., a smartphone), a tablet computer, or a laptop computer.

Methods of Use

Figure 4:
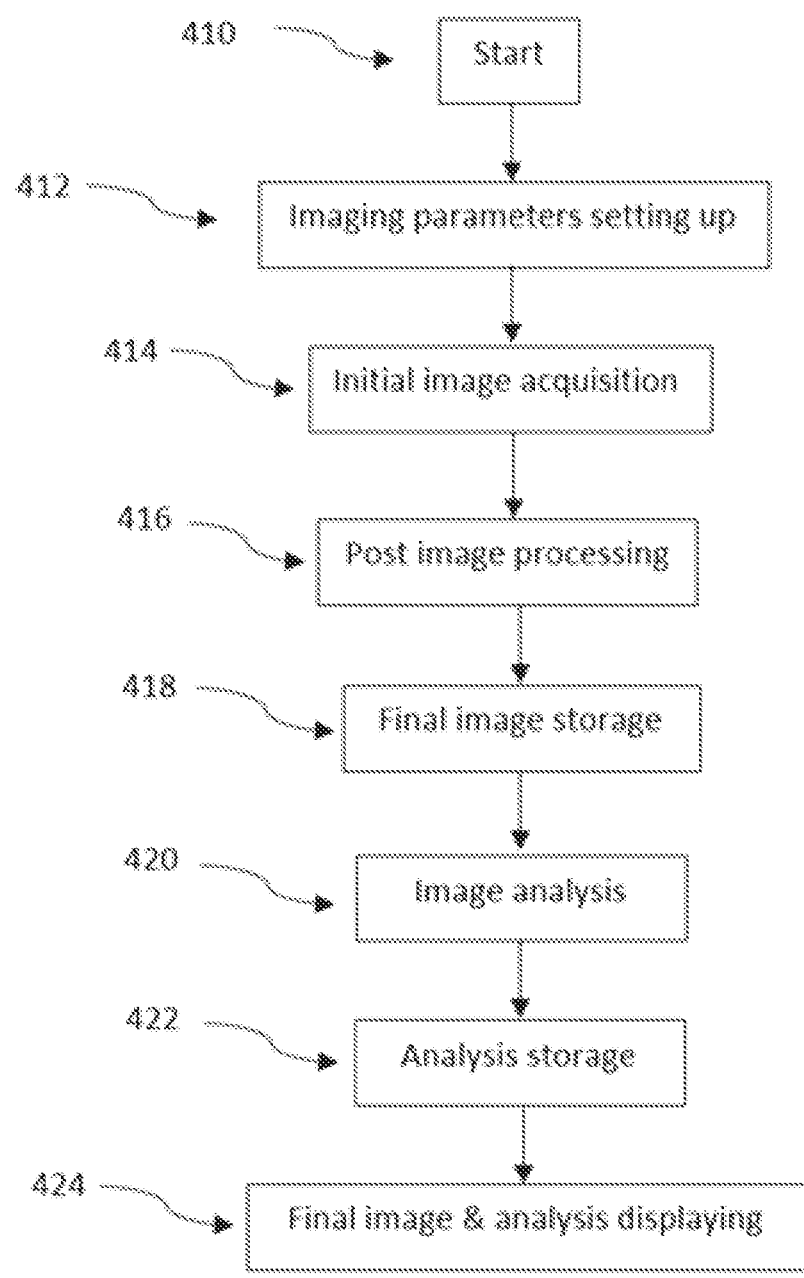
FIG. 4 shows a schematic representation of a method of capturing a bio-image of a substrate consistent with one embodiment of the present disclosure.
Figure 5:
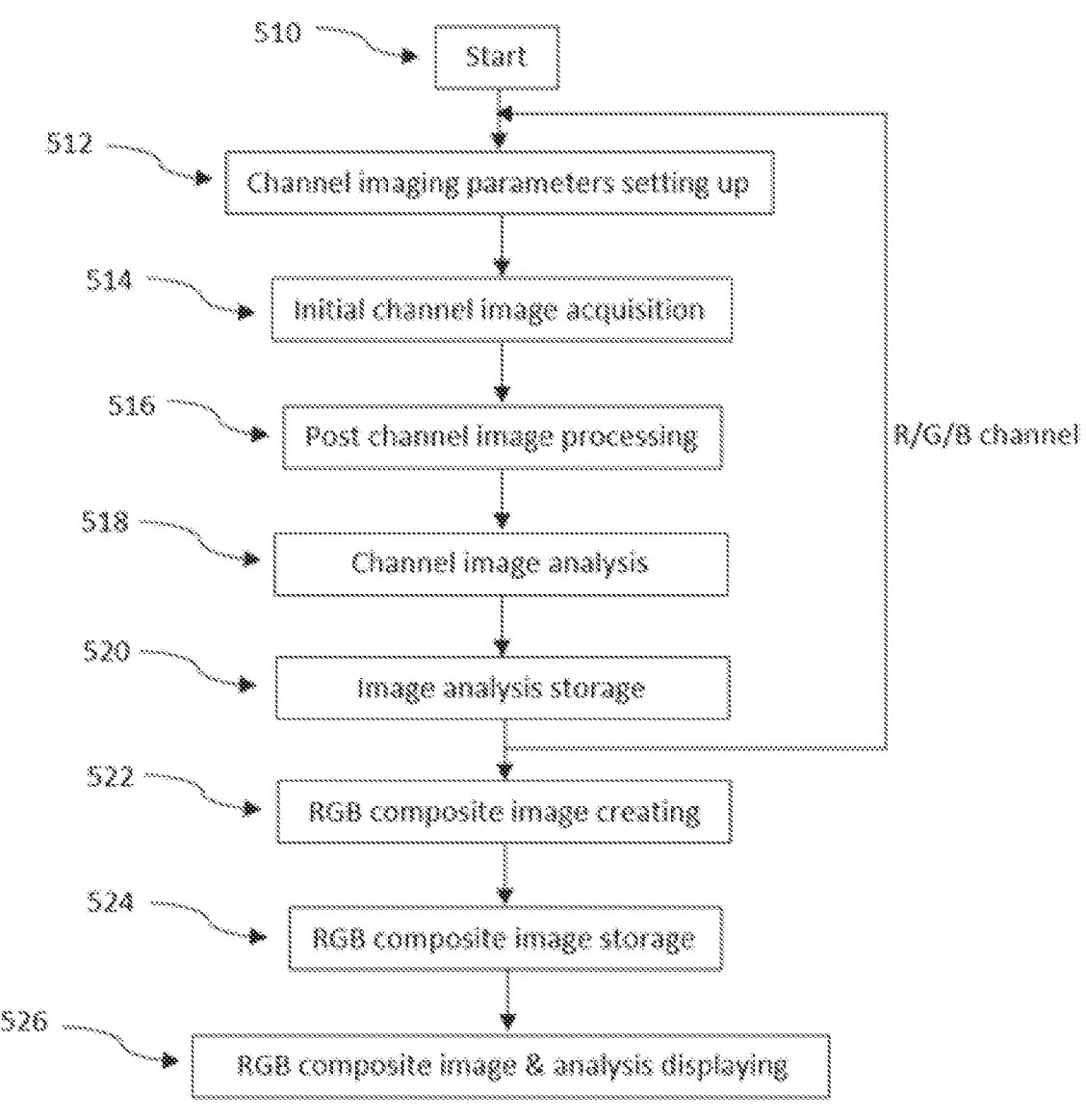
FIG. 5 shows a schematic representation of a method of capturing a bio-image of a substrate consistent with another embodiment of the present disclosure.

Referring now generally to FIGS. 4-5, methods of using bio-imaging devices 100 and bio-imaging systems 10 as disclosed herein enable convenient (e.g., "one-click") means for capturing a bio-image, processing a bio-image, and/or analyzing a bio-image of a specimen S.

FIG. 4 illustrates the workflow of a process 40, in accordance with one embodiment, for conveniently (e.g., with one-click) obtaining a final image and its related analysis displayed on user's browser for a chemiluminescent specimen S.

At step 410, users click a start button on the user interface displayed on his computer/smartphone/tablet 200 (e.g., via a browser). Upon selection of the start button by the user, the software in the microprocessor of the control subsystem 104 will automatically set up all imaging parameters (e.g., bins, gain, exposure time and image mode) of the imaging subsystem 101 at step 412. At step 414, the software sends a command to the camera 120 to acquire a blot image and the camera 120 will send it back to the microprocessor. Once the initial image is acquired by the control subsystem 104, the image is automatically processed with all necessary corrections by the software at step 416 and is stored in the storage device of the SBC 122 at step 418. The final (e.g., processed) image is analyzed by the software at step 420 and all the analyzed data is saved in the storage device in the bio-imaging device 100 at step 422. The processed image and the analysis data is then directly displayed on the mobile computing device 200 (e.g., via a browser) in step 424.

The process of automatically setting up imaging parameters at step 412 may be accomplished according to means known to those of skill in the art. In one such known process, a raw image of the specimen S is captured by default conditions first, then the imaging parameters are adjusted depending on the software's analysis of the raw image. Thereafter, final image of the specimen S is captured using the adjusted imaging parameters. The image captured using the adjusted imaging parameters is then processed and analyzed in later steps of the method 40.

The step 416 of initial image processing includes, for example, applying dark or glow correction, line correction, despeckler, lens distortion correction, and/or bin condition to the initial image. The image analysis step 420 may include, for example, inverting background, subtracting background, specifying the number of lanes, finding bands, loading molecular weight value, calculating molecular weight, and/or calculating signal intensity and other intensity related values.

The final image and the analyzed data will be saved to the browser memory temporarily and be displayed on the user interface (e.g., browser) of the mobile computing device 200. Users can easily download the image and the analyzed results to local storage components of the mobile computing device 200 if needed, and/or may use the mobile computing device's on-board communications protocols (e.g., email, SMS, MMS, etc.) to transmit the image and analyzed results to another device or to cloud storage.

In other embodiments, one or more (e.g., all) of the image capture, processing, and/or analyzing parameters for chemiluminescent imaging can be established or adjusted manually using the interface (e.g., browser) of the mobile computing device 200. In such embodiments, the set or adjusted parameters and analysis conditions are sent to the microprocessor of the control subsystem 104 via the network 300 or direct connection between the mobile computing device 200 and the bio-imaging device 100. The remaining steps of the method 40 are substantially the same as the steps for automatically capturing, processing, and analyzing a bioimage as described above.

Referring now to FIG. 5, a process 50 for conveniently (e.g., with one click) obtaining a visible color image of a specimen S and its related analysis displayed on the mobile computing device 200 according to one embodiment of the present disclosure is shown representatively.

At step 510, users click a start button displayed on the user interface of the mobile computing device 200 (e.g., via a browser). Red, Green, and Blue channels will be used for visible color imaging. Upon selection of the start button by the user, the software automatically sets up imaging conditions for Red channel at step 512. Then main control board 124 transfers signal(s) from the microprocessor of the control subsystem 104 to the trans-illuminator 102 or the epi-illuminator 108 to turn on red light, and choose clear filter in the filter wheels 110, 116. Camera 120 receives a signal from the microprocessor to acquire an initial red channel image, after which time the red light is turned off at step 514. The acquired Red channel image is processed by the software in the microprocessor at step 516 and is temporarily saved in memory component of the SBC 122 or transmitted to memory of the mobile device 200 or associated with the network 300. The red channel image is analyzed at step 518 and the analyzed results will be stored in memory of the bio-imaging device 100, of the mobile computing device 200, or associated with the network 300 at step 520. The control subsystem 104 then automatically repeat steps 512-520 for the Green channel and the Blue channel images, with the control subsystem 104 causing the trans-illuminator 102 or the epi-illuminator 108 to generate green light or blue light, respectively, in successive iterations of step 512. Once Red, Green and Blue channel images are each collected, a Red, Green and Blue (RGB) composite image is created by software of the control subsystem 104 at step 522. The composited image will be saved in the storage component of the SBC 122, in memory of the mobile computing device 200, or in memory associated with the network 300 at step 524. Finally, the RGB composite image and the image analysis will be displayed on the mobile computing device 200 (e.g., via a browser) in step 526.

The processing of the Red/Green/Blue channel image at step 516 may include, for example, applying despeckler, flatfield correction, lens distortion correction and/or bin condition. A preferred channel will be pre-determined by the software in the analysis for channel image at step 518. The analysis procedure may include inverting background, subtracting background, specifying the number of lanes, finding bands, loading molecular value, calculating molecular weight, calculating signal intensity and other intensity related values, and/or calculating normalization.

In other embodiments, one or more (e.g., all) of the image capture, processing, and/or analyzing parameters for chemiluminescent imaging can be established or adjusted manually using the interface (e.g., browser) of the mobile computing device 200. In such embodiments, the set or adjusted parameters and analysis conditions are sent to the microprocessor of the control subsystem 104 via the network 300 or direct connection between the mobile computing device 200 and the bio-imaging device 100. The remaining steps of the method 50 are substantially the same as the steps for automatically capturing, processing, and analyzing a bioimage as described above.

The procedure for one-click fluorescent imaging may be substantially similar to a procedure 50 for visible color imaging, except that when the software acquires an initial channel image, the main control board 124 is configured to cause the epi-illuminator 108 to turn on and off, and to cause the excitation filter 110 and the emission filter 116 to be selected based on the channel.

The procedure for channel imaging analyzing for fluorescent images is substantially the same as the procedure at step 518 for visible color channel imaging analysis of method 50.

In some embodiments, a method of obtaining a bio-image of a substrate, the method comprises: placing a substrate on the substrate holder of the bio-imaging device of the bio-imaging system as disclosed herein; optionally illuminating the substrate with the at least one illumination source; capturing, via the camera, light emanating from or transmitted by the substrate; and transmitting, via the control subsystem, data associated with the captured light to the mobile computing device. In some embodiments, the method further comprises a step of converting, via the control subsystem, the captured light into an image data file, wherein the step of transmitting the data comprises transmitting the image data file to the mobile computing device. In some embodiments, the method further comprises a step of converting, via the mobile computing device, the transmitted data associated with the captured light into an image data file. In some embodiments, the steps of optionally illuminating the substrate, and capturing the light emanating from or transmitted by the substrate, and transmitting the data to the mobile computing device comprises receiving only a single input selection from a user via the mobile computing device.

EXAMPLES

Example 1. A Bio-Imaging Device Comprising:
an imaging subsystem including:
    a substrate holder configured to support a substrate to be imaged,
    a first mirror configured to reflect light emitted or transmitted by the
    substrate through the substrate holder,
    a second mirror configured to reflect light reflected by the first mirror,
    a lens configured to focus light reflected by the second mirror, and
    a camera configured to capture light focused by the lens; and a control subsystem including:
 a main control board configured to control operation of the imaging subsystem, and
 a single board computer configured to communicate with the main control board and communicate with a mobile computing device.

Example 2. The bio-imaging device of Example 1 further comprising at least one illumination source configured to contact the substrate with light radiation.

Example 3. The bio-imaging device of Example 1 or Example 2, wherein the bio-imaging device does not include a display screen.

Example 4. The bio-imaging device of any one preceding Example, wherein the first mirror is disposed at a fixed angle relative to a plane defined by a surface of the substrate holder.

Example 5. The bio-imaging device of any one preceding Example, wherein the second mirror is disposed at an adjustable angle relative to the first mirror.

Example 6. The bio-imaging device of any one preceding Example further comprising a first filter disposed between the second mirror and the camera.

Example 7. The bio-imaging device of any one preceding Example, wherein the at least one illumination source comprises a trans-illuminator disposed to emit light through the specimen toward the substrate holder and the first mirror.

Example 8. The bio-imaging device of any one preceding Example, wherein the at least one illumination source comprises an epi-illuminator disposed to reflect light off the specimen toward the substrate holder and the first mirror.

Example 9. The bio-imaging device of Example 8 further comprising a second filter disposed between the epi-illuminator and the substrate holder.

Example 10. The bio-imaging device of any one preceding Example, wherein the at least one illumination source, the first mirror, the second mirror, the lens, and the camera define an optical path.

Example 11. A bio-imaging system comprising:
 a bio-imaging device of any one preceding Example;
 a data network in operable communication with the bio-imaging device; and
 a mobile computing device in operable communication with the bio-imaging device.

Example 12. The bio-imaging system of Example 11, wherein the mobile computing device is in operable communication with the bio-imaging device via the data network.

Example 13. The bio-imaging system of Example 11, wherein the mobile computing device is directly in operable communication with bio-imaging device not via the data network.

Example 14. The bio-imaging system of Example 13, wherein the data network employs a near-field communications (NFC) protocol.

Example 15. The bio-imaging system of any one of Examples 11-14, wherein the data network is a WiFi network, a local area network, an ethernet network, a cellular network, an Internet network, or an intranet network.

Example 16. The bio-imaging system of any one of Examples 11-15, wherein the mobile computing device comprises a mobile phone (e.g., a smartphone), a tablet computer, or a laptop computer.

Example 17. A method of obtaining a bio-image of a substrate, the method comprising:
 (a) placing a substrate on the substrate holder of the bio-imaging device of the bio-imaging system of any one of Examples 11-16;

(b) optionally illuminating the substrate with the at least one illumination source;
 (c) capturing, via the camera, light emanating from or transmitted by the substrate; and
 (d) transmitting, via the control subsystem, data associated with the captured light to the mobile computing device.

Example 18. The method of Example 17 further comprising a step of (e) converting, via the control subsystem, the captured light into an image data file, wherein the step of transmitting the data comprises transmitting the image data file to the mobile computing device.

Example 19. The method of Example 17 further comprising a step of (f) converting, via the mobile computing device, the transmitted data associated with the captured light into an image data file.

Example 20. The method of any one of Examples 17-19, wherein the steps of optionally illuminating the substrate, and capturing the light emanating from or transmitted by the substrate, and transmitting the data to the mobile computing device comprises receiving only a single input selection from a user via the mobile computing device.

Example 21. The method of Example 17, wherein steps (b), (c), and (d) all occur upon receipt of a single input instruction from a user via the mobile computing device.

Example 22. The method of Example 18, wherein steps (b), (c), (d), and (e) all occur upon receipt of a single input instruction from a user via the mobile computing device.

Example 23. The method of Example 19, wherein steps (b), (c), (d), and (f) all occur upon receipt of a single input instruction from a user via the mobile computing device.

Example 24. The method of any one of Examples 20-23, wherein the input is received from the user via a non-downloaded user interface.

Example 25. The method of Example 24, wherein the non-downloaded user interface is a website.

Example 26. The method of any one of Examples 20-25 further comprising a step of processing the data associated with the captured light without accepting a second input from the user.

Example 27. The method of Example 26 further comprising a step of analyzing the processed data without accepting a second input from the user.

Example 28. The method of any one of Examples 17-27 further comprising a step of connecting, via wired or wireless connection, the mobile computing device to the bio-imaging device before any of steps (b), (c), or (d).

What is claimed is:
1. A bio-imaging system comprising:
 a bio-imaging device comprising:
  an imaging subsystem including:
   a substrate holder configured to support a substrate to be imaged,
   a first mirror configured to reflect light emitted or transmitted by the substrate through the substrate holder,
   a second mirror configured to reflect light reflected by the first mirror,
   a lens configured to focus light reflected by the second mirror, and
   a camera configured to capture light focused by the lens; and
  a control subsystem including:
   a main control board configured to control operation of the imaging subsystem, and
   a single board computer configured to be embedded with control software and to communicate with the main control board and a mobile computing device that is in operable communication with the bio-imaging device; and a data network in operable communication with the bio-imaging device, wherein a user interface configured to control the bio-imaging device is accessible via a web browser associated with the mobile computing device without requiring installation of any control software.

2. The bio-imaging system of claim 1, wherein the mobile computing device is in operable communication with the bio-imaging device via the data network.

3. The bio-imaging system of claim 1, wherein the mobile computing device is directly in operable communication with bio-imaging device not via the data network.

4. The bio-imaging system of claim 3, wherein the data network employs a near-field communications protocol.

5. The bio-imaging system of claim 1, wherein the data network is a WiFi network, a local area network, an ethernet network, a cellular network, an Internet network, a Bluetooth protocol, or an intranet network.

6. The bio-imaging system of claim 1, wherein the mobile computing device comprises a mobile phone, a tablet computer, or a laptop computer.

7. The bio-imaging system of claim 1, the bio-imaging device further comprising at least one illumination source configured to contact the substrate with light radiation.

8. The bio-imaging system of claim 7, wherein the at least one illumination source comprises a trans-illuminator disposed to emit light through the substrate toward the substrate holder and the first mirror.

9. The bio-imaging system of claim 7, wherein the at least one illumination source comprises an epi-illuminator disposed to reflect light off the substrate toward the substrate holder and the first mirror.

10. The bio-imaging system of claim 9 further comprising a second filter disposed between the epi-illuminator and the substrate holder.

11. The bio-imaging system of claim 1, wherein the second mirror is disposed at an adjustable angle relative to the first mirror.

12. The bio-imaging system of claim 1, the bio-imaging device further comprising a first filter disposed between the second mirror and the camera.

* * * * *